US008584246B2

(12) United States Patent
Haviv et al.

(10) Patent No.: US 8,584,246 B2
(45) Date of Patent: *Nov. 12, 2013

(54) ELIMINATING FALSE REPORTS OF SECURITY VULNERABILITIES WHEN TESTING COMPUTER SOFTWARE

(75) Inventors: Yinnon Avraham Haviv, Beerotaim (IL); Roee Hay, Haifa (IL); Marco Pistoia, Amawalk, NY (US); Adi Sharabani, Ramat Gan (IL); Takaaki Tateishi, Kanagawa-ken (JP); Omer Tripp, Har-Adar (IL); Omri Weisman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 955 days.

This patent is subject to a terminal disclaimer.

(21) Appl. No.: 12/578,013

(22) Filed: Oct. 13, 2009

(65) Prior Publication Data
US 2011/0087892 A1   Apr. 14, 2011

(51) Int. Cl.
G06F 12/14 (2006.01)
(52) U.S. Cl.
USPC ............. 726/25; 726/22; 726/23; 726/24; 713/187
(58) Field of Classification Search
None
See application file for complete search history.

(56) References Cited

U.S. PATENT DOCUMENTS

| 7,058,805 | B2 | 6/2006 | Sibert |
| 7,240,332 | B2 | 7/2007 | Berg et al. |
| 7,392,545 | B1 | 6/2008 | Weber et al. |
| 7,398,516 | B2 | 7/2008 | Berg et al. |
| 7,398,517 | B2 | 7/2008 | Berg et al. |
| 7,454,797 | B2 | 11/2008 | Zhu et al. |
| 7,530,101 | B2 | 5/2009 | Gallo et al. |
| 7,530,107 | B1 | 5/2009 | Ono et al. |
| 7,617,489 | B2 | 11/2009 | Peyton et al. |
| 7,661,097 | B2 | 2/2010 | Mukkavilli |
| 7,849,509 | B2 * | 12/2010 | Venkatapathy et al. ........ 726/25 |

(Continued)

FOREIGN PATENT DOCUMENTS

| JP | 2007052625 A | 3/2007 |
| JP | 2008060745 | 3/2008 |
| WO | WO2006118193 | 11/2006 |
| WO | WO2007116490 | 10/2007 |
| WO | 2008047351 A2 | 4/2008 |
| WO | WO2008071795 | 6/2008 |

OTHER PUBLICATIONS

Scott et al., "Specifying and Enforcing Application-Level Web Security Policies", IEEE, vol. 15 No. 4, 2003, http://wwww2.computer.org/portal/web/csdl/doi/10.1109/TKDE.2003.1208998; 13 pages.

(Continued)

*Primary Examiner* — Pramila Parthasarathy
(74) *Attorney, Agent, or Firm* — Cantor Colburn LLP

(57) ABSTRACT

A system for eliminating false reports of security vulnerabilities when testing computer software, including a taint analysis engine configured to identify a tainted variable v in a computer application, a data mapping identification engine configured to identify a variable x within the application that holds data derived from v, where x is in a different format than v, an AddData identification engine configured to identify an AddData operation within the application that is performed on x, a signature identification engine configured to identify a Sign operation within the application that is performed on the results of the AddData operation on x, a signature comparison identification engine configured to identify an operation within the application that compares the results of the Sign operation with another value.

13 Claims, 3 Drawing Sheets

(56) References Cited

U.S. PATENT DOCUMENTS

| | | | |
|---|---|---|---|
| 7,853,987 | B2 | 12/2010 | Balasubramanian et al. |
| 7,937,692 | B2 | 5/2011 | Drepper |
| 7,975,257 | B2 | 7/2011 | Fanning et al. |
| 7,987,451 | B1 | 7/2011 | Dalcher |
| 8,166,532 | B2 | 4/2012 | Chowdhury et al. |
| 2004/0260940 | A1 | 12/2004 | Berg et al. |
| 2005/0108562 | A1 | 5/2005 | Khazan et al. |
| 2006/0150160 | A1 | 7/2006 | Taft et al. |
| 2006/0277539 | A1 | 12/2006 | Amarasinghe et al. |
| 2007/0016894 | A1 | 1/2007 | Sreedhar |
| 2007/0083933 | A1 | 4/2007 | Venkatapathy et al. |
| 2007/0088740 | A1 | 4/2007 | Davies et al. |
| 2007/0150869 | A1 | 6/2007 | Tateishi et al. |
| 2008/0148061 | A1 | 6/2008 | Jin et al. |
| 2008/0184208 | A1 | 7/2008 | Sreedhar et al. |
| 2008/0244536 | A1 | 10/2008 | Farchi et al. |
| 2008/0270993 | A1 | 10/2008 | Tateishi et al. |
| 2010/0043048 | A1 | 2/2010 | Dolby et al. |
| 2010/0333201 | A1 | 12/2010 | Haviv et al. |
| 2011/0072517 | A1 | 3/2011 | Tripp |
| 2011/0078794 | A1 | 3/2011 | Manni et al. |
| 2011/0087892 | A1 | 4/2011 | Haviv et al. |
| 2011/0131656 | A1 | 6/2011 | Haviv et al. |
| 2011/0321016 | A1 | 12/2011 | Haviv et al. |

OTHER PUBLICATIONS

Geay et al., "Modular String-Sensitive Permission Analysis with Demand-Driven Precision", ICSE' 09, May 16-24, 2009, pp. 177-187.

Wassermann, G., et al., "Sound and Precise Analysis of Web Applications for Injection Vulnerabilities," SINGPLAN Notices, vol. 42, No. 6 (Jun. 2007), pp. 32-41.

Pietraszek et al., "Defending Against Injection Attacks Through Context-Sensitive String Evaluation," Lecture Notes in Computer Science (including subseries Lecture Notes in Artificial Intelligence and Lecture Notes in Bioinformatics). vol. 3858 LNCS (2006) pp. 124-145. Recent Advances in Intrusion Detection—8th International Symposium, RAID (2005), Revised papers.

Benjamin Livshits, "Improving Software Security with Precise Static and Runtime Analysis," Dissertation submitted to the department of computer science and the committee on graduate studies of Stanford University in partial fulfillment of the requirements for the degree of doctor of philosophy, Nov. 2006, 250 pages.

Christensen et al., "Precise Analysis of String Expressions," SAS 2003, LNCS 2694, pp. 1-18.

Minamide, Y., "Static Approximation of Dynamically Generated Web Pages," WWW 2005, May 10-14, 2005, pp. 423-441.

Engelfriet et al., "MSO definable string transductions and two-way finite state transducers," Technical Report 98-13, Dec. 1998, pp. 1-62.

Moller et al., "The Pointer Assertion Logic Engine," PLDI 2001, Proceedings of the ACM SIGPLAN 2001 Conference on Programming Language Design and Implementation, pp. 1-11.

James Harvey, "A Static Secure Flow Analyzer for a Sub-set of Java", US Naval Post-Graduate School, Mar. 1998, 98 pages.

Scott et al, "Specifying and Enforcing Application-Level Web Security Policies", IEEE, vol. 15, No. 4, 2003, http://www2.computer.org/portal/web/csdl/doi/10.1109/TKDE.2003.1208998 ; 13 pages.

Shinji, "Programming Methodology by 2nd Order Logic", Technical Report of the Institute of Electronics, Inforamtion and Comminication Engineers; Oct. 20, 1996; 7 pages.

* cited by examiner

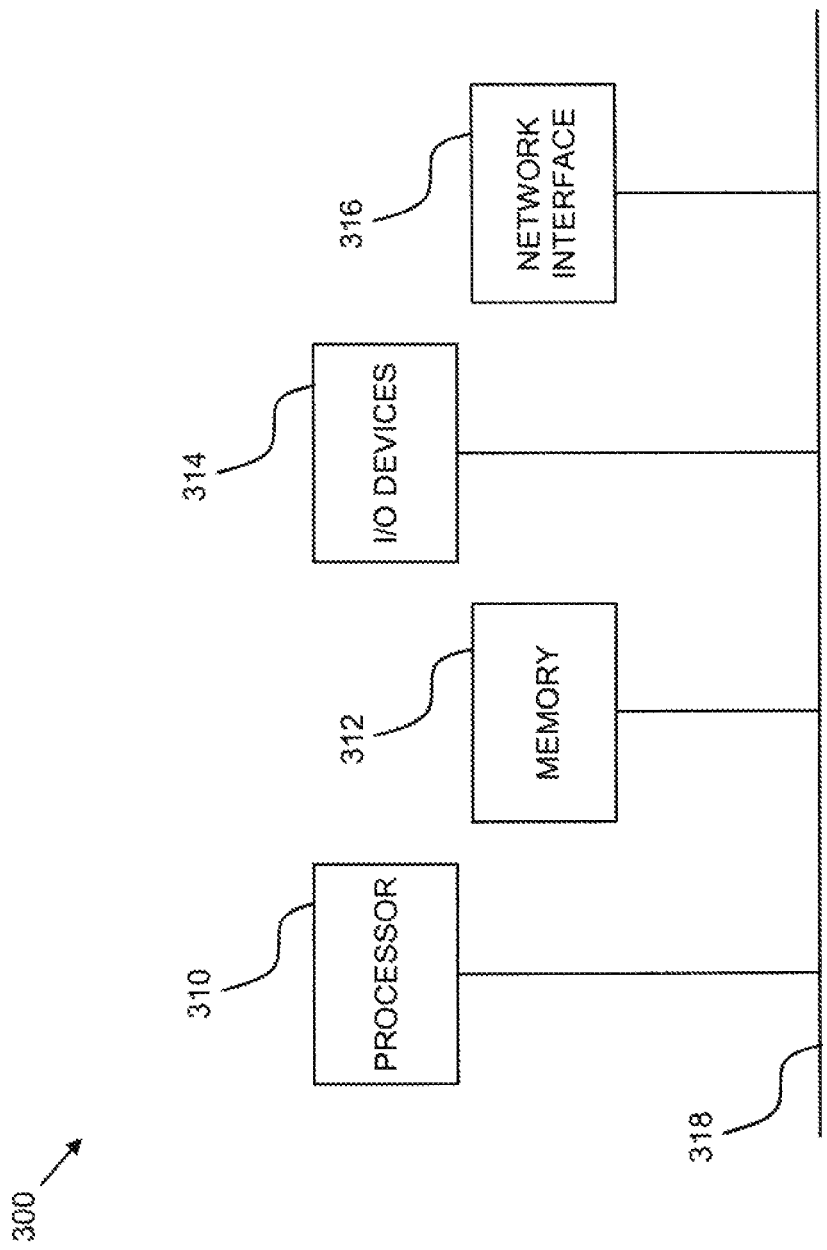

ELIMINATING FALSE REPORTS OF SECURITY VULNERABILITIES WHEN TESTING COMPUTER SOFTWARE

FIELD OF THE INVENTION

The invention relates to computer software testing in general, and more particularly to eliminating false reports of security vulnerabilities when testing computer software.

BACKGROUND OF THE INVENTION

Static analysis tools, referred to herein as "static analyzers," are well known automated tools that provide information about computer software while applying only static considerations (i.e., without executing a computer software application). In one type of static analysis, application variables whose inputs are provided to the application from sources that are external to the application are assumed to be "tainted," as they potentially expose the application to malicious attacks. Such tainted variables are typically identified and reported by static analyzers as security vulnerabilities that may require further analysis by a software developer and possibly corrective action. However, many such tainted variables may encounter one or more points within an application, referred to herein as "downgraders" that validate and/or sanitize their data to ensure that they are not malicious, thus downgrading the threat they pose from "tainted" to "benign." A tainted variable that is downgraded by an application need not be reported by static analyzers as security vulnerabilities.

One common type of downgrading is performed for computer network-based client-server applications that store data at the client, which data is later sent back to the server for use by it. In order to prevent computer users from tampering with client-side data, a cryptographic signature is created of the data, and the signature is stored at the client along with the data. Data that is sent from the client back to the server is sent together with the signature. The server then downgrades the signature by recreating the signature from the data and comparing the recreated signature with the original signature to determine whether the data was tampered with. Such downgrades are referred to herein as "cryptographic down graders."

Although static analyzers should not identify and report downgraded variables as security vulnerabilities, they typically do so anyway, resulting in "false positive" reports that software developers waste time evaluating. To avoid this, users of static analyzers typically resort to the tedious process of manually specifying downgrades prior to performing static analysis, often after modifying the software to segregate downgraders from the rest of the application. Manually specifying and segregating cryptographic downgrades is particularly tedious. Systems and methods for eliminating false reports of security vulnerabilities when testing computer software without requiring cryptographic downgraders to be manually specified or segregated would therefore be advantageous.

SUMMARY OF THE INVENTION

The invention in embodiments thereof discloses novel systems and methods for eliminating false reports of security vulnerabilities when testing computer software.

In one aspect of the invention a system is provided for eliminating false reports of security vulnerabilities when testing computer software, the system including a taint analysis engine configured to identify a tainted variable v in a computer application, a data mapping identification engine configured to identify a variable x within the application that holds data derived from v, where x is in a different format than v, an AddData identification engine configured to identify an AddData operation within the application that is performed on a signature identification engine configured to identify a Sign operation within the application that is performed on the results of the AddData operation on x, a signature comparison identification engine configured to identify an operation within the application that compares the results of the Sign operation with another value, where the taint analysis engine, data mapping identification engine, AddData identification engine, signature identification engine, and signature comparison identification engine are implemented in either of computer hardware and computer software and embodied in a tangible computer-readable medium.

In another aspect of the invention the system further includes a static analyzer configured to report the tainted variable v as a security vulnerability if not all of the following conditions are true x is identified within the application that holds the content of v in a different format than v, at least one AddData operation is identified within the application that is performed on x, at least one Sign operation is identified within the application that is performed on the results of the AddData operation on x, and at least one operation is identified within the application that compares the results of the Sign operation with another value.

In another aspect of the invention the static analyzer is configured to report the tainted variable v as a security vulnerability in connection with any operation of the application that is not among a set of operations of the application that are performed only if all of the conditions are true and if the results of the Sign operation are equal to the value to which it is compared.

In another aspect of the invention the taint analysis engine is configured to identify the tainted variable v using static analysis that is performed on either of source code and intermediate code of the application.

In another aspect of the invention x is a byte array.

In another aspect of the invention the AddData operation has input parameters including x and a container into which data from x are processed.

In another aspect of the invention the Sign operation results in a cryptographic signature.

In another aspect of the invention a method is provided for eliminating false reports of security vulnerabilities when testing computer software, the method including a) identifying a tainted variable v in a computer application, b) identifying a variable x within the application that holds data derived from v, where x is in a different format than v, c) identifying an AddData operation within the application that is performed on x, d) identifying a Sign operation within the application that is performed on the results of the AddData operation on x, e) identifying an operation within the application that compares the results of the Sign operation with another value, and f) reporting the tainted variable v as a security vulnerability if not all of the following conditions 1)-4) are true 1) x is identified within the application that holds the content of v in a different format than v, 2) at least one AddData operation is identified within the application that is performed on x, 3) at least one Sign operation is identified within the application that is performed on the results of the AddData operation on x, and 4) at least one operation is identified within the application that compares the results of the Sign operation with another value, where the steps a)-f) are implemented in either of computer hardware and computer software and embodied in a tangible computer-readable medium.

In another aspect of the invention the reporting step includes reporting the tainted variable v as a security vulnerability in connection with any operation of the application that is not among a set of operations of the application that are performed only if all of the conditions are true and if the results of the Sign operation are equal to the value to which it is compared.

In another aspect of the invention the identifying step a) includes identifying the tainted variable v using static analysis that is performed on either of source code and intermediate code of the application.

In another aspect of the invention the identifying step b) includes identifying where x is a byte array.

In another aspect of the invention the identifying step c) includes identifying the AddData operation where the AddData operation has input parameters including x and a container into which data from x are processed.

In another aspect of the invention the identifying step d) includes identifying where the Sign operation results in a cryptographic signature.

In another aspect of the invention a computer program product is provided for eliminating false reports of security vulnerabilities when testing computer software, the computer program product including a computer readable medium, computer program instructions operative to a) identify a tainted variable v in a computer application, b) Identify a variable x within the application that holds data derived from v, where x is in a different format than v, c) identify an AddData operation within the application that is performed on x, d) identify a Sign operation within the application that is performed on the results of the AddData operation on x, e) identify an operation within the application that compares the results of the Sign operation with another value, and f) report the tainted variable v as a security vulnerability if not all of the following conditions 1)-4) are true 1) x is identified within the application that holds the content of v in a different format than v, 2) at least one AddData operation is identified within the application that is performed on x, 3) at least one Sign operation is identified within the application that is performed on the results of the AddData operation on x, and 4) at least one operation is identified within the application that compares the results of the Sign operation with another value, where the program instructions are stored on the computer readable medium.

BRIEF DESCRIPTION OF THE DRAWINGS

The invention will be understood and appreciated more fully from the following detailed description taken in conjunction with the appended drawings in which:

FIG. 3 is a simplified block diagram illustrating an exemplary hardware implementation of a computing system, constructed and operative in accordance with an embodiment of the invention.

DETAILED DESCRIPTION OF THE INVENTION

Figure 1:
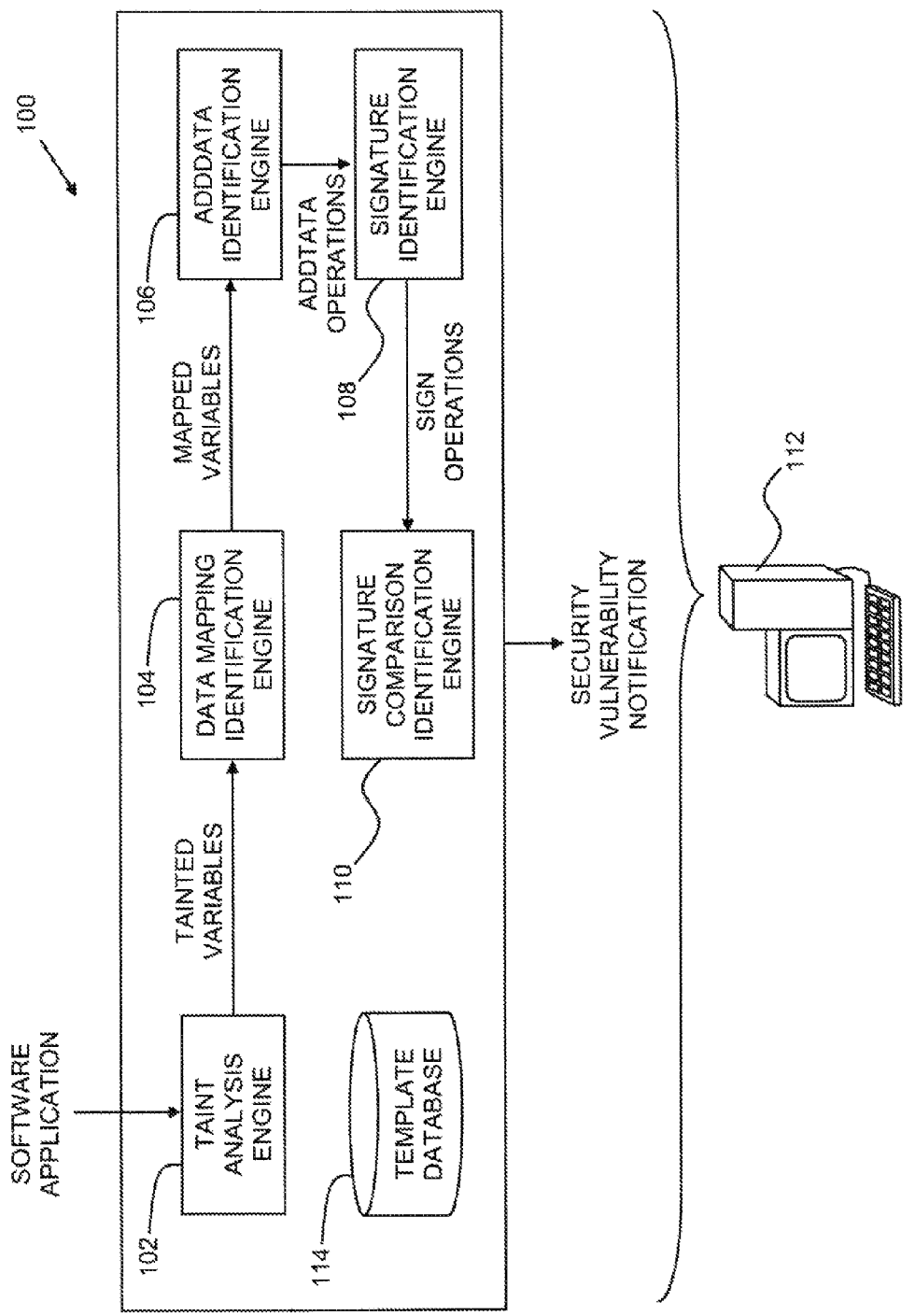
FIG. 1 is a simplified conceptual illustration of a system for identifying security vulnerabilities in a computer software application, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory, in the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for eliminating false reports of security vulnerabilities when testing computer software, constructed and operative in accordance with an embodiment of the invention. In the system of FIG. 1, a static analyzer, generally designated 100, is shown including a taint analysis engine 102 that identifies one or more tainted variables v in a computer application using conventional techniques, such as static analysis that is performed on the application's source code or intermediate code. A variable v is considered to be a tainted variable if v's data derives directly or indirectly from a source within the application where "source" is defined as a part of the application that is exposed to input that is provided externally to the application. For each tainted variables v identified, a data mapping identification engine 104 identifies one or more variables x within the application that hold data derived from v, but in a different format than v, such as in a byte array as shown in any of the following examples:

x=v.getBytes( )
x=v.getBytes("UTF-8")
x=Arrays.copyOf(v.getBytes( ), v.getBytes( ).length)

For each such variable x that is identified, an AddData identification engine 106 identifies one or more AddData operations within the application that are performed on x. An AddData operation preferably includes any operation that has input parameters including x and one or more containers into which data from x are processed. Abstracted examples of AddData operations in common JAVA™ libraries include:

1. In javax.crypto.MAC:
 a. The "update(byte[ ] input)" method is an AddData operation
 b. The "doFinal(byte[ ] input)" method is also an AddData operation (and also returns a signature)
2. In Java.security.MessageDigest:
 a. The "update(byte[ ] input)" method is an AddData operation
 b. The "digest(byte[ ] input)" method is also an AddData operation (and also returns a signature)

For each such AddData operation that is identified, a signature identification engine 108 identifies one or more Sign operations within the application that are performed on the results of the AddData operation on x, such results now referred to as ADx. A Sign operation is defined as any operation that results in a cryptographic signature, such as is shown in any of the following abstracted examples:

1. In javax.crypto.MAC, doFinal( )/doFinal(byte[ ] input) are both signing operations.
2. In java.security.MessageDigest, digest(byte[ ] input)/reset( ) are both signing operations.

For each such Sign operation on ADx that is identified, a signature comparison identification engine 110 identities one or more operations within the application that compare the results of the Sign operation, such results now referred to as Sv, with another value, such as is shown in any of the following abstracted examples:

if (Arrays.equals(some_value, generateHMAC(key, dest)){ . . . }, where Sv in this example is the result of calling generateHMAC(key, dest)
if (MessageDigest.isEqual(Sv, some_value)){ . . . }

In accordance with the invention, if the following is true for a tainted variable v that is identified within a computer application, where at least one variable x is identified within the application that holds the content of v in a different format than v, such as in a byte array of data derived from v;
at least one AddData operation is identified within the application that is performed on x;
at least one Sign operation is identified within the application that is performed on the results of the AddData operation on x; and
at least one operation is identified within the application that compares the results of the Sign operation with another value, then static analyzer 100 determines v to be benign for all application operations that are performed only if the results of the Sign operation are equal to the value to which it is compared. Static analyzer 100 preferably reports any tainted variable v as a security vulnerability in connection with any application operations regarding which v is not determined to be benign. Conversely, static analyzer 100 preferably does not report any tainted variable v as a security vulnerability with respect to those application operations for which v is determined to be benign, such as where variable v has been cryptographically downgraded as described hereinabove. Static analyzer 100 preferably provides security vulnerability reports using any conventional reporting means, such as via a display of a computer 112.

Templates for any of the data mapping, AddData, Sign, and comparison operations described above may be predefined in a template database 114 using conventional techniques, where template database 114 is used by any element of static analyzer 100 to identify corresponding operations within a computer application being statically analyzed.

Figure 2:
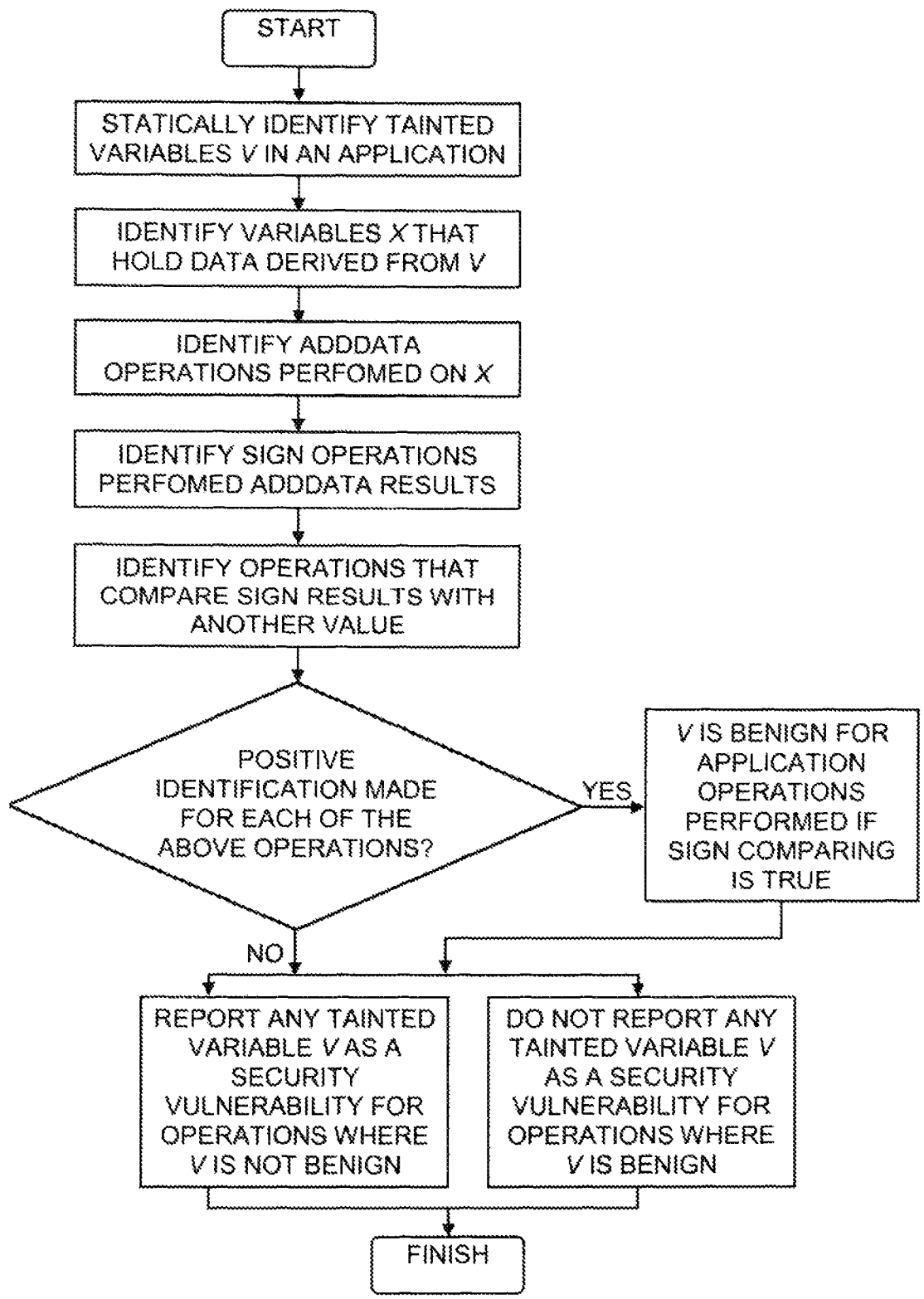
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, one or more tainted variables v are identified in a computer application using conventional techniques. If one or more such variables v are identified, then for each variable v identified one or more variables x are identified within the application that hold data derived from v, but in a different format than v, such as in a byte array. If one or more such variables x are identified, then for each variable x that is identified one or more AddData operation's are identified within the application that are performed on x. If one or more such AddData operations on x are identified, then for each AddData operation performed on x that is identified one or more Sign operations are identified within the application that are performed on the results of the AddData operations on x, such results now referred to as ADx. If one or more such Sign operations on ADx are identified, then for each Sign operation performed on ADx that is identified one or more operations are identified within the application that compare the results of the Sign operation, such results now referred to as Sv, with another value. In accordance with the invention, if the following is true for a tainted variable v that is identified within a computer application, where

- at least one variable x is identified within the application that holds the content of v in a different format than v, such as in a byte array of data derived from v;
- at least one AddData operation is identified within the application that is performed on x;
- at least one Sign operation is identified within the application that is performed on the results of the AddData operation on x; and
- at least one operation is identified within the application that compares the results of the Sign operation with another value, then v is determined to be benign for all application operations that are performed only if the results of the Sign operation are equal to the value to which it is compared. Any tainted variable v is reported as a security vulnerability in connection with any application operations regarding which v is not determined to be benign. Conversely, any tainted variable v is not reported to be tainted with respect to those application operations for which v is determined to be benign, such as where variable v has been cryptographically downgraded as described hereinabove.

It will be appreciated that any aspect of the invention described hereinabove may be implemented as a computer program product embodied in a computer-readable medium, such as in the form of computer program instructions stored on magnetic or optical storage media or embedded within computer hardware, and may be executed by or otherwise be made accessible to a computer 112 (FIG. 1).

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" of "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for eliminating false reports of security vulnerabilities when testing computer software, the system comprising:
    a computing system including a processor configured to:
        identify a tainted variable v in a computer application;
        identify a variable x within said application that holds data derived from v, wherein x is in a different format than v;
        identify an AddData operation within said application that is performed on x;
        identify a Sign operation within said application that is performed on the results of said AddData operation on x;
        identify an operation within said application that compares the results of said Sign operation with another value; and
        report said tainted variable v as a security vulnerability in response to not all of the following conditions being true:
            x is identified within said application that holds the content of v in a different format than v,
            at least one AddData operation is identified within said application that is performed on x,
            at least one Sign operation is identified within said application that is performed on the results of said AddData operation on x, and
            at least one operation is identified within said application that compares the results of said Sign operation with another value.

2. A system according to claim 1 wherein said processor is configured to report said tainted variable v as a security vulnerability in connection with any operation of said application that is not among a set of operations of said application that are performed only if all of said conditions are true and if the results of the Sign operation are equal to the value to which it is compared.

3. A system according to claim 1 wherein said processor is further configured to identify said tainted variable v using static analysis that is performed on either of source code and intermediate code of said application.

4. A system according to claim 1 wherein x is a byte array.

5. A system according to claim 1 wherein said AddData operation has input parameters including x and a container into which data from x are processed.

6. A system according to claim 1 wherein said Sign operation results in a cryptographic signature.

7. A computer-implemented method for eliminating false reports of security vulnerabilities in relation to a processor testing computer software, the method comprising:
   a) identifying whether a tainted variable v is in a computer application;
   b) identifying whether a variable x is within said application that holds data derived from v, wherein x is in a different format than v;
   c) identifying whether an AddData operation within said application is performed on x;
   d) identifying whether a Sign operation within said application is performed on the results of said AddData operation on x;
   e) identifying whether an operation within said application compares the results of said Sign operation with another value; and
   f) reporting said tainted variable v as a security vulnerability in response to not all of the following conditions 1)-4) being true:
      1) x is identified within said application that holds the content of v in a different format that v,
      2) at least one AddData operation is identified within said application that is performed on x,
      3) at least one Sign operation is identified within said application that is performed on the results of said AddData operation on x, and
      4) at least one operation is identified within said application aht compares the results of said Sign operation with another value.

8. A computer-implemented method according to claim 7 wherein said reporting step comprises reporting said tainted variable v as a security vulnerability in connection with any operation of said application that is not among a set of operations of said application that are performed only in response to all of said conditions being true and in response to the results of the Sign operation being equal to the value to which it is compared.

9. A computer-implemented method according to claim 7 wherein said identifying step a) comprises identifying said tainted variable v using static analyses that is performed on either of source code and intermediate code of said application.

10. A computer-implemented method according to claim 7 wherein said identifying step b) comprises identifying where x is a byte array.

11. A computer-implemented method according to claim 7 wherein said identifying step c) comprises identifying said AddData operation wherein said AddData operation has input parameters including x and a container into which data from x are processed.

12. A computer-implemented method according to claim 7 wherein said identifying step d) comprises identifying wherein said Sign operation results in a cryptographic signature.

13. A computer program product for eliminating false reports of security vulnerabilities when testing computer software, the computer program product comprising:
   a computer readable storage device having computer readable program code stored thereon, the computer readable program code comprising computer program instructions operative to:
      a) identify whether a tainted variable v is in a computer application;
      b) identify whether a variable x is within said applidation that holds data derived from v, wherein x is in a different format than v;
      c) identify whether an AddData operation is within said application that is performed on x;
      d) identify whether a Sign operation within said application is performed on the results of said AddData operation on x;
      e) identify whether an operation within said application comprares the results of said Sign operation with another value; and
      f) report said tainted variable v as a security vulnerability in response to not all the following conditions 1)-4) being true:
         1) x is identified within said application that holds the content of v in a different format than v,
         2) at least one AddData operation is identified within said application that is performed on x,
         3) at least one Sign operation is identified within said application that is performed on the results of said AddData operation on x, and
         4) at least one operation is identified within said application that compares the results of said Sign operation with another value.

* * * * *